United States Patent
Saiki et al.

[11] Patent Number: 5,872,666
[45] Date of Patent: Feb. 16, 1999

[54] DECODER CIRCUITRY WITH PRML SIGNAL PROCESSING FOR REPRODUCING APPARATUS

[75] Inventors: Eisaku Saiki, Yokohama; Kazutosi Ashikawa, Maebashi; Seiichi Mita, Kanagawa-ken; Shintaro Suzumura; Shoichi Miyazawa, both of Yokohama; Tsuguyoshi Hirooka, Fujisawa, all of Japan

[73] Assignee: Hitachi, Ltd., Tokyo, Japan

[21] Appl. No.: 560,387

[22] Filed: Nov. 17, 1995

[30] Foreign Application Priority Data

Nov. 18, 1994 [JP] Japan .................................. 6-285206

[51] Int. Cl.⁶ ..................................................... G11B 5/09
[52] U.S. Cl. .............................................. 360/46; 360/51
[58] Field of Search ................................. 360/46, 51, 65; 375/229, 263, 262, 341

[56] References Cited

U.S. PATENT DOCUMENTS

| | | | |
|---|---|---|---|
| 4,340,882 | 7/1982 | Maio et al. | 340/347 |
| 5,233,482 | 8/1993 | Galbraith et al. | 360/46 |
| 5,341,249 | 8/1994 | Abbott et al. | 360/51 |
| 5,563,864 | 10/1996 | Kobayashi et al. | 369/59 |

FOREIGN PATENT DOCUMENTS

| | | |
|---|---|---|
| 0316459 | 5/1989 | European Pat. Off. . |
| 61-129913 | 6/1986 | Japan . |
| 1-143447 | 6/1989 | Japan . |

OTHER PUBLICATIONS

Dictionary of Computers, Information Processing & Telecommunications, Jerry M. Rosenberg, p. 212, 1984.

*Primary Examiner*—Nabil Hindi
*Assistant Examiner*—Regina Y. Neal
*Attorney, Agent, or Firm*—Antonelli, Terry, Stout & Kraus, LLP

[57] ABSTRACT

Reproducing apparatus with an A/D (analog-to-digital) converter, which realizes high-accuracy data sampling, high-speed data transfer, low dissipation power and low cost. PR (partial response) processing is performed by receiving encoded signals, delaying the received signals on the basis of a reference clock, and adding the delayed signals and the received signals in analog signal form. The added signals are converted into digital values on the basis of the reference clock by the A/D converter, and Viterbi decoding is performed on the basis of the converted digital values. Owing to the PR processing which is performed at a stage preceding the A/D converter, a frequency band for the A/D conversion can be lowered, and hence, the high-accuracy data sampling is permitted.

3 Claims, 14 Drawing Sheets

F I G. 4
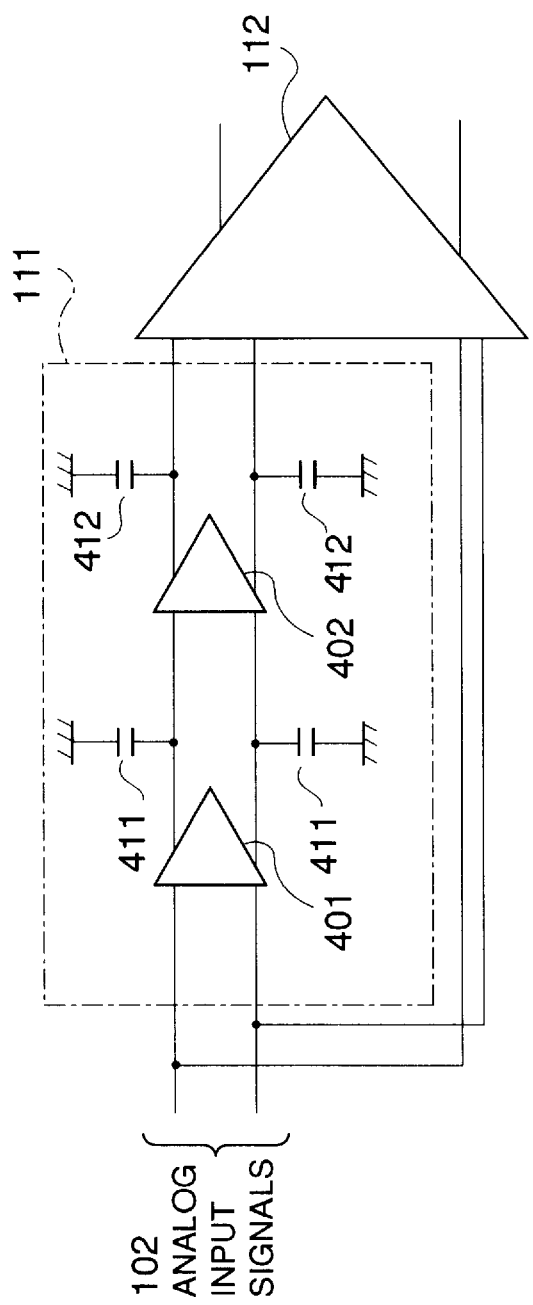

F I G. 11
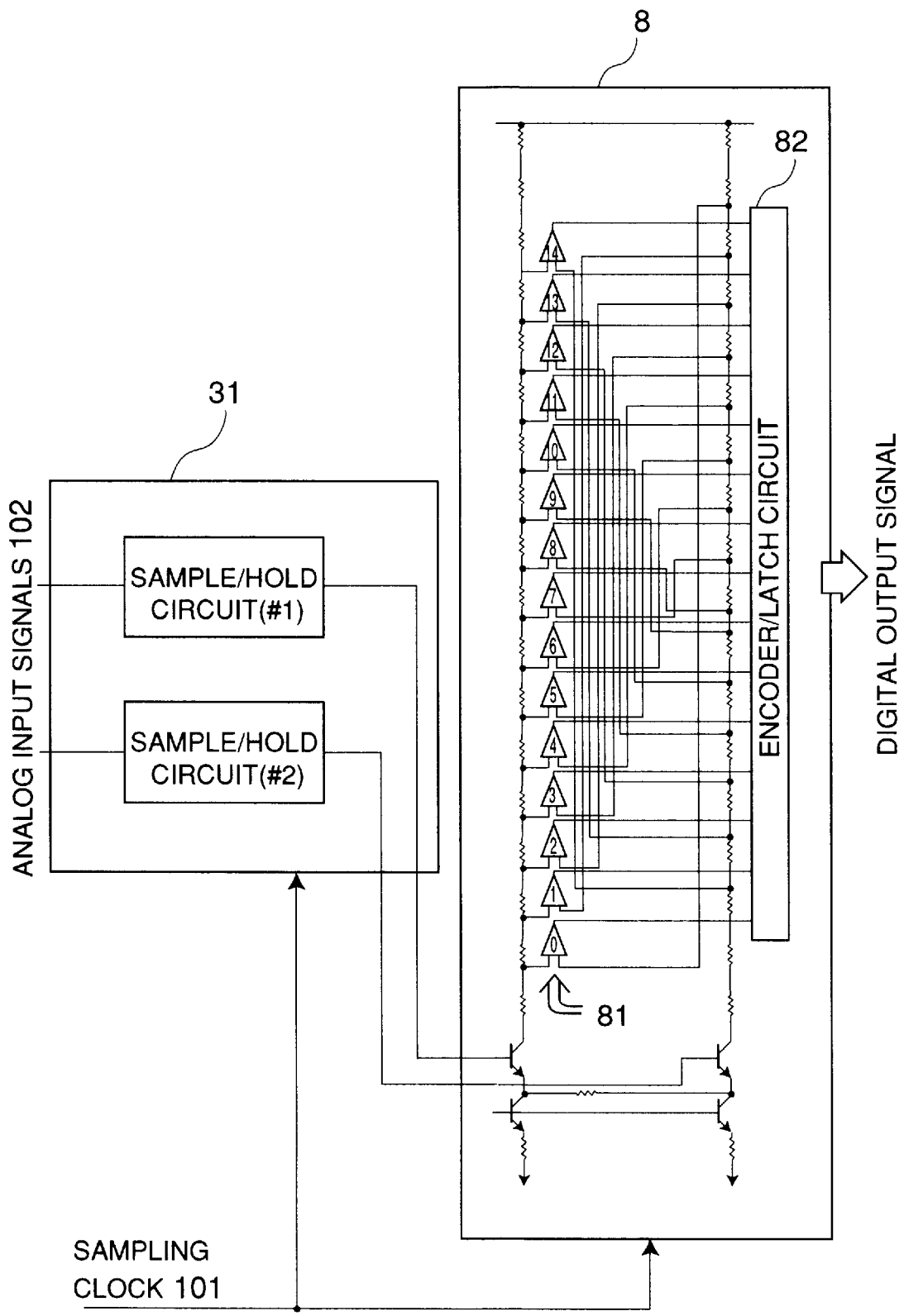

FIG. 14

| ITEMS | EXAMPLE OF PRIOR ART | | EXAMPLES OF PRESENT INVENTION | | | |
|---|---|---|---|---|---|---|
| | | | 1ST EMBODIMENT | | 2ND EMBODIMENT | |
| | CONSTRUCTION | POWER RATIO | CONSTRUCTION | POWER RATIO | CONSTRUCTION | POWER RATIO |
| ACTIVE FILTER | • 7-POLE<br>• EQUIRIPPLE TYPE<br>• WITHOUT BOOST FUNCTION | 0.08 | • 7-POLE<br>• EQUIRIPPLE TYPE<br>• WITH BOOST FUNCTION | 0.11 | • 7-POLE<br>• EQUIRIPPLE TYPE<br>• WITH BOOST FUNCTION | 0.11 |
| A/D CONVERTER | • 6 BITS<br>• WITHOUT S/H FUNCTION<br>• SINGLE-END TYPE | 0.30 | • 5 BITS<br>• WITH S/H FUNCTION<br>• DIFFERENTIAL TYPE | 0.20 | • 4 BITS<br>• WITH S/H FUNCTION<br>• DIFFERENTIAL TYPE | 0.10 |
| OTHER ANALOG CIRCUITS | | 0.15 | ← | 0.15 | ← | 0.15 |
| EQUALIZER | • 6 BITS<br>• 9 TAPS | 0.18 | • 5 BITS<br>• 9 TAPS | 0.15 | • 4 BITS<br>• 9 TAPS | 0.11 |
| VITERBI DETECTOR | • 6 BITS | 0.07 | • 5 BITS | 0.05 | • 4 BITS | 0.03 |
| OTHER DIGITAL CIRCUITS | • ON 6-BIT BASIS | 0.22 | • ON 5-BIT BASIS | 0.19 | • ON 4-BIT BASIS | 0.15 |
| TOTAL | 2 CHIPS | 1.00 | 1 CHIP | 0.85 | 1 CHIP | 0.65 |

DECODER CIRCUITRY WITH PRML SIGNAL PROCESSING FOR REPRODUCING APPARATUS

BACKGROUND OF THE INVENTION

1. Field of the Invention

The present invention relates to decoder circuitry and a reproducing apparatus. More particularly, it relates to decoder circuitry with an A/D (analog-to-digital) converter as is well suited to a recording/reproducing apparatus, e.g., a magnetic disk drive. It also relates to such a reproducing apparatus.

2. Description of Related Art

In a magnetic recording/reproducing apparatus typified by a magnetic disk drive, high-density recording has advanced year by year to realize larger storage capacities. Besides, user needs and higher-density recording have made the transfer rate of data higher and the size of the apparatus smaller.

For realizing the higher performance and smaller size of the apparatus, it is indispensable to implement electronic circuits in the form of an LSI (large-scale integrated circuit). The LSI implementation is very useful for reducing the number of components and the packaging area of the apparatus and for enhancing the performance and the functions thereof. In a recent magnetic disk drive, an analog/digital hybrid LSI, in which a plurality of functional parts for handling analog signals and a plurality of functional parts for handling digital signals are put into a single chip together, is utilized owing to the progress of semiconductor technology. Typical is a read/write signal processing LSI.

Read/write signal processing systems contribute greatly to the higher-density recording. Recently, data reproduction processing systems which utilize partial response based on maximum likelihood detection (PRML: Partial Response Maximum Likelihood) are being put into practical use. An example of a circuit arrangement conforming to the PRML system is disclosed in FIG. 3 of U.S. Pat. No. 5,233,482 entitled "THERMAL ASPERITY COMPENSATION FOR PRML DATA DETECTION". Other examples are techniques stated in the official gazettes of Japanese Patent Applications Laid-Open (Kokai) Nos. 1-143447 and No. 61-129913.

FIG. 15 of the accompanying drawings illustrates the schematic construction of a prior-art magnetic disk drive which employs PRML. The magnetic disk drive shown in FIG. includes a magnetic head 2 which records signal information on a magnetic recording medium 1 in the form of a magnetic signal and which converts a magnetic signal on the magnetic recording medium 1 into an electric signal, an actuator 3 which moves the magnetic head 2 in cases of a tracking control and access control, and a preamplifier 4 which sends a write data signal to the magnetic head 2 and which amplifies an electric signal reproduced by the magnetic head 2. The magnetic disk drive also includes a readout module 5 consisting of a voltage-controlled type variable-gain amplifier (VGA) 6 which controls the signal amplified by the preamplifier 4, to an appropriate amplitude at all times, and then delivers the controlled signal, and a filter 7 which eliminates noise from within the reproduced signal controlled to the predetermined amplitude by the VGA 6. An A/D (analog-to-digital) converter 8 is included in order to convert the output 102 of the filter 7 into a digital signal. Also included is an equalization module 9 consisting of an equalizer 10 which is constructed of a digital transversal filter for performing Nyquist equalization of the digital signal converted by the A/D converter 8, and a PR processor (constructed of a [1+D] circuit) 11 which subjects the output of the equalizer 10 to "PR4" (Partial Response Class-4) processing. Further included is a decoding module 17 consisting of a Viterbi detector 18 which subjects the output of the PR processor 11 to Viterbi detection, and a decoder 19 which decodes the output data of the Viterbi detector 18. The magnetic disk drive also includes a disk controller 24 which transfers data between this disk drive and a host computer (not shown) being a host apparatus, and which controls the various blocks of this disk drive. It also includes a servo positioning detector 25 which serves to position the magnetic head 2 on the basis of the filter output 102, an actuator controller 26 which receives the output of the servo positioning detector 25 and then delivers an actuator control signal, and an actuator driver 27 which receives the actuator control signal and then drives the actuator 3. A PLL (phase-locked loop) controller 16 is included in order to generate a sampling clock 101 which is used when the filter output 102 is converted into the digital signal by the A/D converter 8. Also included is an AGC (automatic gain control) module 12 consisting of an AGC circuit 13 which controls the amplitude of the reproduced signal to an appropriate value, a switching circuit 14 which switches the outputs of the AGC circuit 13, and an integrator 15 which integrates the output current of the switching circuit 14 and then delivers a control current for the gain adjustment of the VGA 6. Further included is a recording module 20 consisting of an encoder 23 which encodes data delivered from the disk controller 24, a precoder 22 which affords interference characteristics reverse to the PR equalization on the reproduction side, and a write pre-compensator 21 which compensates for a magnetizing interference. A microprocessor 28 is included in order to control the whole disk drive.

Referring to FIG. 15, when data is to be reproduced, the electrical signal reproduced by the magnetic head 2 is passed through the preamplifier 4, VGA 6 and filter 7 and is converted into the digital signal by the A/D converter 8. The timing at which the filter output 102 is converted into the digital signal by the A/D converter 8, is controlled into an appropriate phase by the PLL controller 16. The output of the A/D converter 8 thus produced is passed through the equalizer 10 and PR processor 11. Thereafter, the resulting signal is detected by the Viterbi detector 18 and is decoded by the decoder 19. Subsequently, the decoded signal is delivered to the disk controller 24. The AGC module 12 controls the gain of the VGA 6 to an appropriate value.

Generally, in a magnetic disk drive, an A/D converter is necessitated for adopting the PRML signal processing system. The A/D converter of high speed and high accuracy, however, dissipates a lot of power. Moreover, the data transfer rate of the magnetic disk drive heightens abruptly, and the frequencies of signals to be handled by this disk drive increase. That is, the magnetic disk drive requires analog circuits of wide bands and high accuracies and digital circuits capable of fast operations. Accordingly, the dissipation power of the magnetic disk drive increases inevitably, and the read/write signal processing LSI thereof becomes difficult to implement as a single chip. Therefore, the PRML signal processing has heretofore been coped with by externally mounting the A/D converter or by employing a multichip layout.

As shown in FIG. 16, the read/write signal processing LSI of the prior-art magnetic disk drive has a two-chip layout configured of an analog-group LSI in which the A/D converter etc. for handling analog signals are integrated, and a digital-group LSI in which the equalizer etc. for handling digital signals are integrated.

Problems to be stated below are involved in the signal processing semiconductor IC (integrated circuit) including the A/D converter in the prior art.

With conventional semiconductor technology, the signal processing semiconductor IC is configured of the plurality of LSIs for a data transfer rate of, at least, about 80 (Mbits/ second). This poses the problem that I/O (input/output) buffers for I/O signals to be exchanged between the LSI's dissipate a lot of power. The configuration of the plurality of LSIs also poses the problem that losses arise in the signals of data which are exchanged between inputs and outputs, so the transfers of the data are difficult to speed up. That is, the sampling performance of the A/D converter degrades with the data transfer rate. In the signal processing semiconductor IC in the prior art, the number of bits of the A/D converter is set at 6 or larger for the data transfer rate of, at least, about 80 (Mbits/second). Therefore, the single-chip implementation of the signal processing semiconductor IC is very difficult from the viewpoint of power dissipation.

SUMMARY OF THE INVENTION

It is accordingly an object of the present invention to provide decoder circuitry and a reproducing apparatus which are capable of data sampling of high accuracy.

Another object of the present invention is to attain higher-speed data transfer and lower dissipation power in decoder circuitry and a reproducing apparatus.

In order to accomplish the above objects, decoder circuitry according to the present invention comprises a readout circuit which reads signals out of a recording medium; a PR (partial response) processing circuit which subjects the signals read out by the readout circuit, to PR processing in analog signal form; an A/D (analog-to-digital) converter which converts the signals processed by the PR processing circuit, into digital data on the basis of the timing of a reference clock; an equalizer which equalizes the digital data converted by the A/D converter; a decoder circuit which decodes the digital data equalized by the equalizer; and a PLL (phase-locked loop) circuit which generates the reference clock.

Alternatively, decoder circuitry comprises a readout circuit which reads signals out of a recording medium; a sample-and-hold circuit which samples the signals read out by the readout circuit, on the basis of a reference clock, and then holding the sampled signals; an A/D (analog-to-digital) converter which converts the signals held by the sample-and-hold circuit, into digital data on the basis of the timing of the reference clock; an equalizer which equalizes the digital data converted by the A/D converter; a PR (partial response) processing circuit which subjects the digital data equalized by the equalizer, to PR processing, and then delivering the digital data subjected to the PR processing; a decoder circuit which decodes the digital data delivered from the PR processing circuit; and a PLL (phase-locked loop) circuit which generates the reference clock.

Besides, a method of decoding signals on the basis of a reference clock comprises the step of receiving encoded signals; the step of delaying the received signals on the basis of the reference clock; the step of adding the delayed signals and the received signals in analog signal form; the step of converting the added signals into digital values on the basis of the reference clock; and the step of performing Viterbi decoding on the basis of the converted digital values.

In the present invention, a readout circuit reads a signal out of a recording medium which bears data, and a PR processing circuit subjects the signal read out by the readout circuit to PR processing in analog signal form. An A/D converter converts the signal, processed by the PR processing circuit, into digital data on the basis of the timing of a reference clock, and an equalizer equalizes the digital data converted by the A/D converter. A decoder circuit decodes the digital data equalized by the equalizer. Besides, the PLL circuit generates the reference clock.

A signal frequency band for the A/D conversion can be lowered by arranging the PR processing circuit at a stage preceding the A/D converter as explained above. It is therefore possible to perform data sampling of high accuracy and to cope with data transfer of high speed. Further, in a case where each of the PR processing circuit and the A/D converter is endowed with a differential type circuit arrangement, data can be sampled at a higher accuracy, so that the number of bits of the A/D converter can be decreased to reduce the circuit scales of the equalizer etc. Owing to the decrease in the number of bits of the A/D converter, it becomes possible to integrate the readout circuit, the PR processing circuit, the A/D converter, the equalizer, the decoder circuit and the PLL circuit on the same chip.

Alternatively, even when a sample-and-hold circuit is arranged at a stage preceding the A/D converter, high-accuracy data sampling can be performed, and high-speed data transfer can be coped with. Further, in a case where each of the sample-and-hold circuit and the A/D converter is endowed with a differential type circuit arrangement, data can be sampled at a higher accuracy. As a result, the number of bits of the A/D converter can be decreased, so that lower dissipation power can be attained.

According to the present invention, a reproducing semiconductor IC having high degree of integration with a built-in A/D converter can be constructed as reproducing circuitry furnished with an A/D converter. Thus, it is possible to render the size of the reproducing apparatus smaller, the transfer rate thereof higher and the dissipation power thereof lower.

Moreover, according to the present invention, data sampling can be performed at a high accuracy in reproducing circuitry furnished with an A/D converter or in a recording/ reproducing semiconductor IC furnished with a built-in A/D converter. Thus, it is possible to realize high-speed data transfer, low dissipation power and low cost.

BRIEF DESCRIPTION OF THE DRAWINGS

FIG. 4 is a diagram showing the circuit arrangement of another bandwidth limiter in the first embodiment;

FIG. 11 is a diagram showing a differential type data sampling circuit arrangement in the second embodiment;

FIG. 14 is a table for explaining the effects of lowering power dissipations in the first and second embodiments;

DESCRIPTION OF THE PREFERRED EMBODIMENTS

Figure 1:
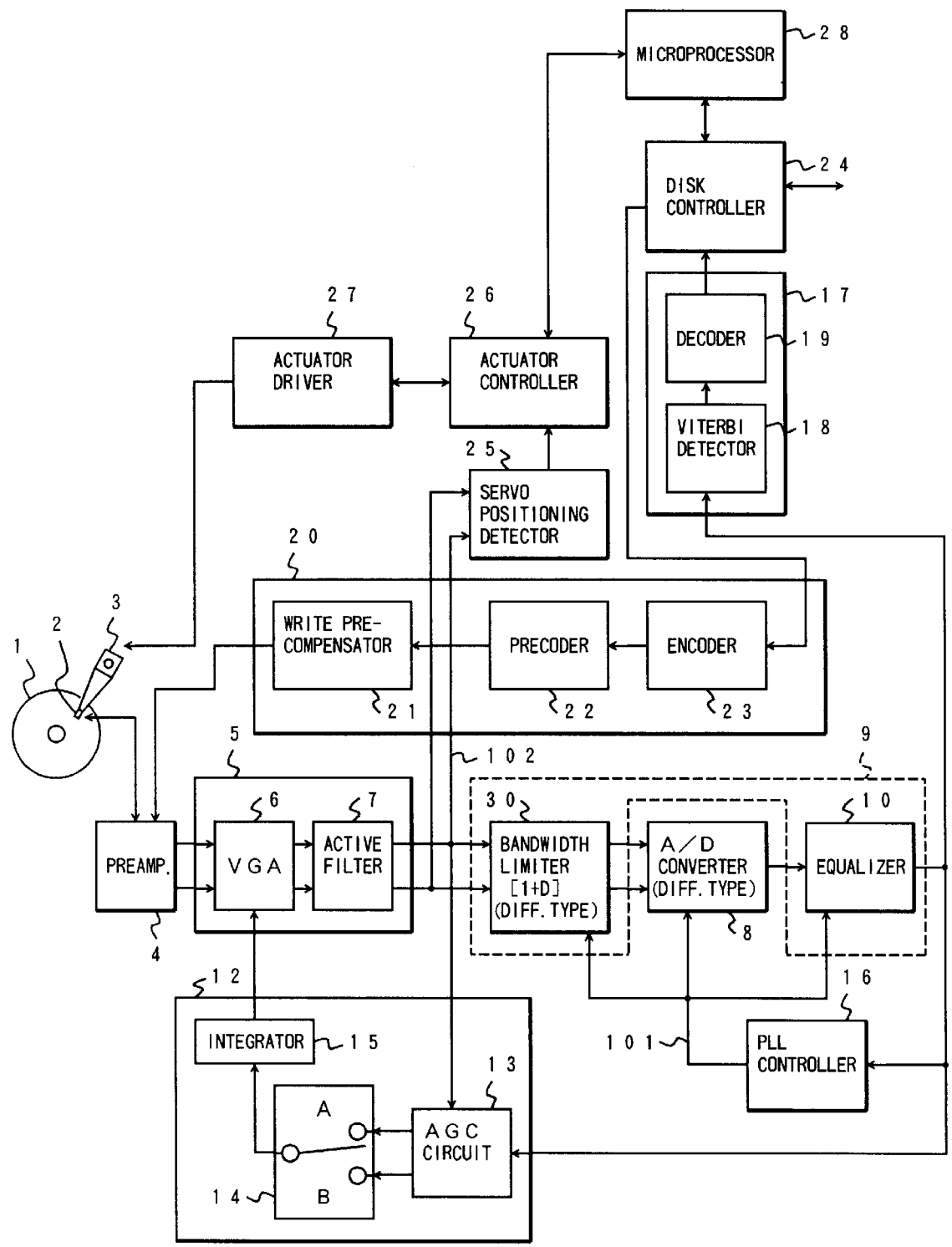
FIG. 1 is a block diagram showing a magnetic disk drive in the first embodiment of the present invention.

Now, one embodiment of the present invention will be described by taking a magnetic disk drive typical of recording/reproducing apparatus as an example. FIG. 1 illustrates the block diagram of the magnetic disk drive which demonstrates the features of this embodiment.

In recent years, in a magnetic disk drive, a Viterbi decoding system which uses digital values has been employed for a decoding module. Viterbi decoding is one of a number of methods of digitally realizing ML (Maximum Likelihood) decoding, and it takes the combination of time-series reproduced signal values into consideration. In the case of employing Viterbi decoding which uses the digital values, circuit arrangements which use digital values are suitable also for a PLL control module and an AGC module. In the case of applying the digital ML decoding to the signal processing system of the magnetic disk drive, there is conjointly used a code form which is called "partial response" (abbreviated to "PR") and which has a power spectrum suited to the transmission characteristics of a magnetic recording medium. "PR4" (Partial Response Class-4) is mentioned as a partial response methods suited to the magnetic disk drive in this embodiment. A system in which the higher recording density of the magnetic disk drive is realized using both the PR and the ML decoding, is called "PRML" (Partial Response Maximum Likelihood). The magnetic disk drive in this embodiment is a reproducing apparatus which utilizes PRML. Herein, in converting analog signals into digital values by an A/D converter, a PR processing module is arranged at a stage preceding the A/D converter. Thus, a frequency band for the A/D conversion is narrowed to suppress noise in a high frequency region to low levels and to improve the S/N (signal-to-noise) ratio of a reproduced signal.

The magnetic disk drive shown in FIG. 1 includes a magnetic recording medium 1 which is rotated at high speed relative to a magnetic head 2, the magnetic head 2 which records signal information on the magnetic recording medium 1 in the form of a magnetic signal and which converts a magnetic signal on the magnetic recording medium 1 into an electrical signal, an actuator 3 which moves the magnetic head 2 in cases of tracking control and access control, and a preamplifier 4 which sends a write data signal to the magnetic head 2 and which amplifies an electrical signal reproduced by the magnetic head 2. The magnetic disk drive also includes a readout module 5 consisting of a voltage-controlled type variable-gain amplifier (VGA) 6 which controls the signal amplified using the preamplifier 4, to an appropriate amplitude at all times, and then delivers the controlled signal, and an active filter 7 which subjects the reproduced signal controlled to the predetermined amplitude by the VGA 6, to noise elimination and analog equalization. In this regard, the readout module 5 may well cover the magnetic head 2, actuator 3 and preamplifier 4. Besides, the magnetic disk drive also includes a bandwidth limiter 30 (constructed of a [1+D] circuit) which limits the frequency band in accordance with "PR4" processing, the aforementioned A/D converter 8 which converts the output of the bandwidth limiter 30 into a digital signal, and an equalizer 10 which is constructed of a digital transversal filter for accurately equalizing the digital signal converted by the A/D converter 8. Herein, the bandwidth limiter 30 and the equalizer 10 constitute an equalization module 9. Further included is a decoding module 17 consisting of a Viterbi detector 18 which subjects the output of the equalizer 10 to the Viterbi detection, and a decoder 19 which decodes the output data of the Viterbi detector 18. The magnetic disk drive also includes a disk controller 24 which transfers data between this disk drive and a host computer constituting a host apparatus, and which controls the various blocks of this disk drive. It also includes a servo positioning detector 25 which serves to position the magnetic head 2 on the basis of the output signal 102 of the active filter 7 not subjected to the analog equalization, an actuator controller 26 which receives the output of the servo positioning detector 25 and then delivers an actuator control signal, and an actuator driver 27 which receives the actuator control signal and then drives the actuator 3. A PLL controller 16 is included in order to generate a sampling clock 101 which serves as a reference clock when the output of the bandwidth limiter 30 is converted into the digital signal by the A/D converter 8. Also included is an AGC module 12 consisting of an AGC circuit 13 which controls the amplitude of the reproduced signal to an appropriate value, a switching circuit 14 which switches the outputs of the AGC circuit 13, and an integrator 15 which integrates the output current of the switching circuit 14 and then delivers a control current for the gain adjustment of the VGA 6. Further included is a recording module 20 consisting of an encoder 23 which encodes data delivered from the disk controller 24, a precoder 22 which affords interference characteristics that are the reverse of the PR equalization on the reproduction side, and a write pre-compensator 21 which compensates for a magnetizing interference. A microprocessor 28 is included in order to control the whole disk drive.

Figure 2:
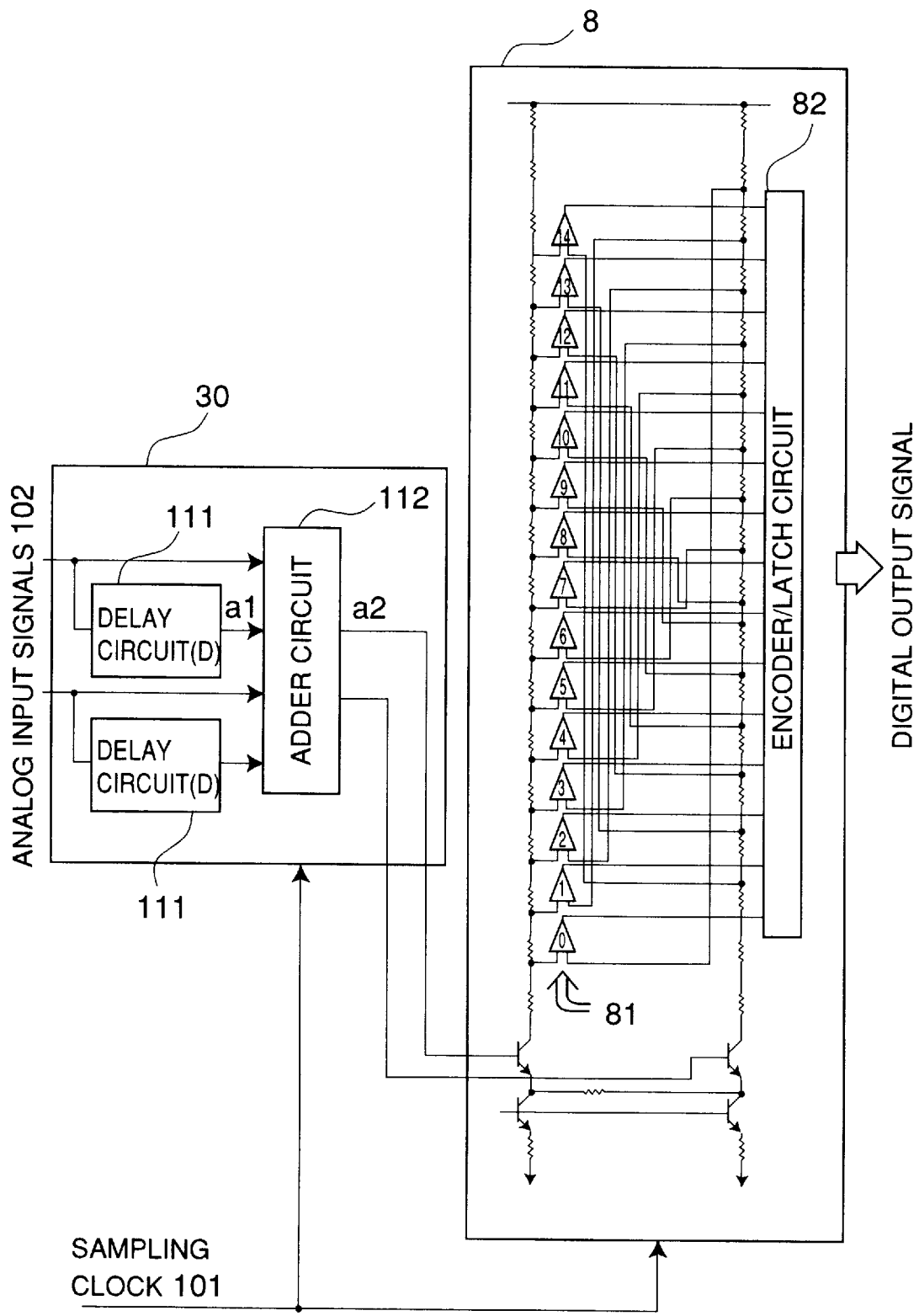
FIG. 2 is a diagram showing a differential type data sampling circuit arrangement in the first embodiment.

FIG. 2 is a block diagram showing the circuit arrangements of the bandwidth limiter 30 and the A/D converter 8.

Figure 3:
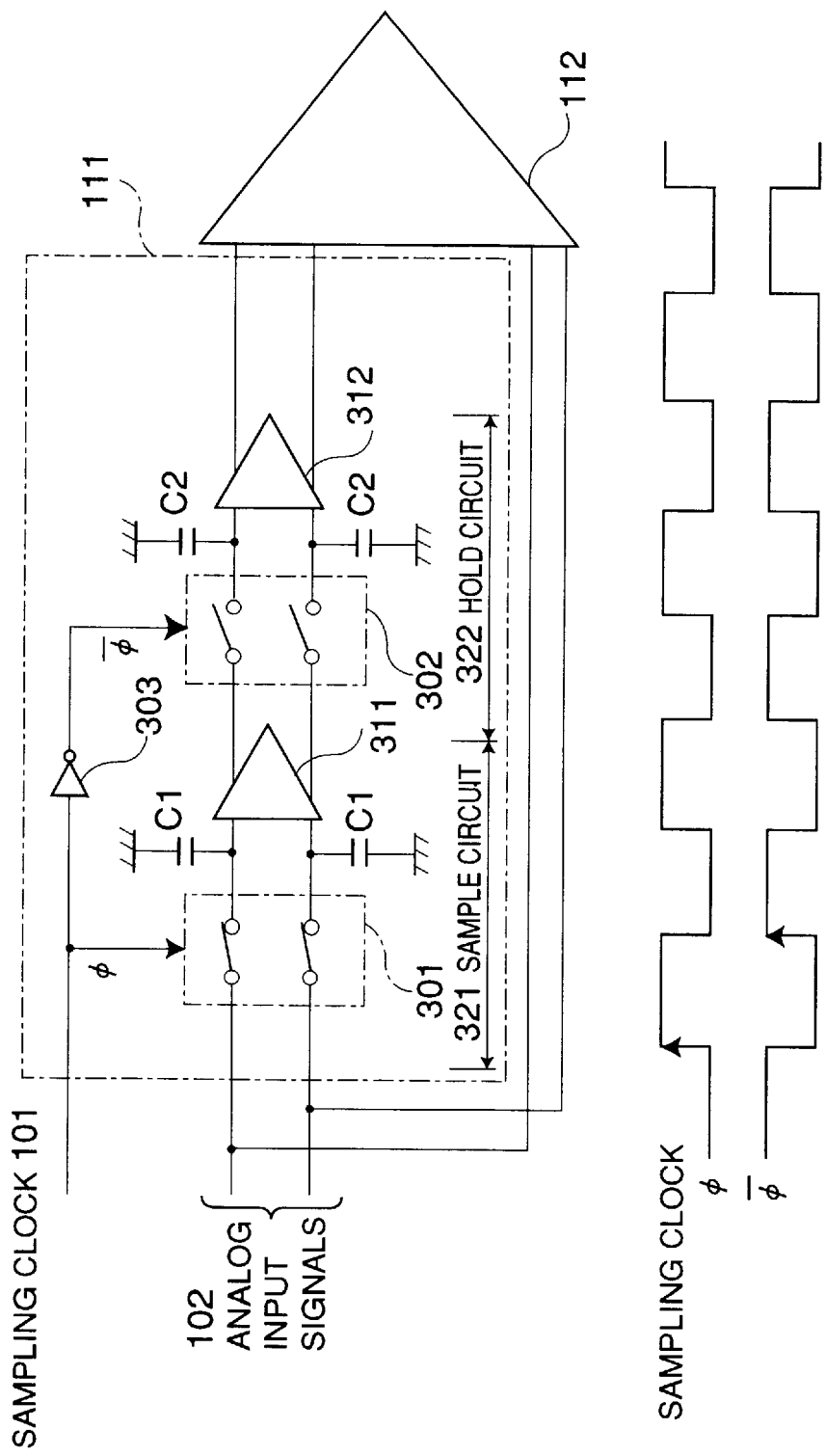
FIG. 3 is a diagram showing the circuit arrangement of a bandwidth limiter in the first embodiment.

The bandwidth limiter 30 includes delay circuits 111 (D) which delay the analog input signals 102 for one sampling clock, respectively, and an adder circuit 112 which adds the analog input signals 102 and the delayed signals. By way of example, the delay circuit 111 can be constructed of a sample-and-hold circuit which conforms to a master/slave system. FIG. 3 is a diagram showing the circuit arrangement of the bandwidth limiter (30) in the case of utilizing the sample-and-hold circuits. Referring to FIG. 3, a sample circuit 321 is constituted by a switch 301, two capacitors C1 and an analog amplifier 311, while a hold circuit 322 is constituted by a switch 302, two capacitors C2 and an analog amplifier 312. The switch 301 is turned ON/OFF in accordance with the sampling clock 101, whereby the sample circuit 321 samples the analog signals 102 in accordance with the timing of the sampling clock 101. On the other hand, the switch 302 is supplied with the sampling clock 101 through an inverter circuit 303 and is turned ON/OFF in accordance with the inverted clock signal, whereby the hold circuit 322 holds the output signals of the sample circuit 321 in accordance with the timing of the inverted clock signal of the sampling clock 101. Thus, the analog signals 102 can be delayed for one clock. The differential type analog adder 112 adds the delayed signals and the analog input signals 102, and delivers the resulting outputs.

Alternatively, the delay circuit 111 may well be constructed without employing any sampling clock, for example, by utilizing the circuit delay of a $g_m$ (mutual conductance) analog amplifier. A circuit arrangement in this case is illustrated in FIG. 4. In the illustrated circuit arrangement, the sampling clock 101 shown in FIGS. 1 and 2 is prevented from entering the bandwidth limiter 30. The example of FIG. 4 is constructed in two stages in such a way that a delay circuit stage is constituted by a $g_m$ analog amplifier 401 and two capacitors 411, and that another delay circuit stage is constituted by a $g_m$ analog amplifier 402 and two capacitors 412. The number of such delay circuit stages can be more enlarged in accordance with a delay magnitude. In this case, letting symbol $g_m$ denote the mutual conductance ($g_m$=1/R where letter R indicates a resistance involved in the circuit stage) and letter C denote the capacitance of the capacitor, the time constant τ of the circuit stage is expressed by $τ=CR=C\times1/g_m$ (where the the mutual conductance $g_m$ is proportional to an operating current), and the delay time Δt of the circuit stage is proportional to the time constant τ thereof. Therefore, any desired delay time can be set.

Figure 6:
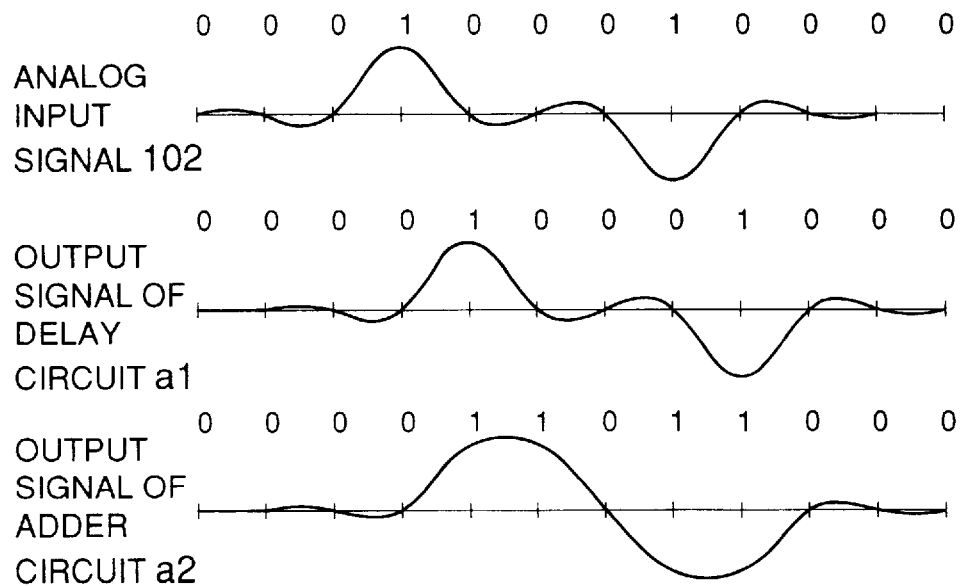
FIG. 6 is an explanatory diagram showing signal waveforms in the bandwidth limiter in the first embodiment.

Besides, FIG. 6 illustrates the waveforms of the signals concerning the bandwidth limiter 30. Referring to FIG. 6 and also to FIG. 2, the adder circuit 112 adds the analog input signal 102 to the delay-circuit output signal a1 which is the signal delayed for one sampling clock, and it delivers the output signal a2. Accordingly, the bandwidth limiter 30 executes the (1+D) processing in analog signal form.

In FIG. 2, the A/D converter 8 is shown as a flash type one of 4-bit configuration, and it includes fifteen comparator circuits 81 and an encoder/latch circuit 82. Besides, in this embodiment, the noise immunity of the A/D converter 8 is enhanced owing to the differential type circuit arrangement thereof. Since the input frequency band of the A/D converter 8 is narrowed by the PR processing of the bandwidth limiter 30, the necessity of widening the frequency band of the A/D converter 8 is relieved compared with that in the prior-art system.

Figure 5:
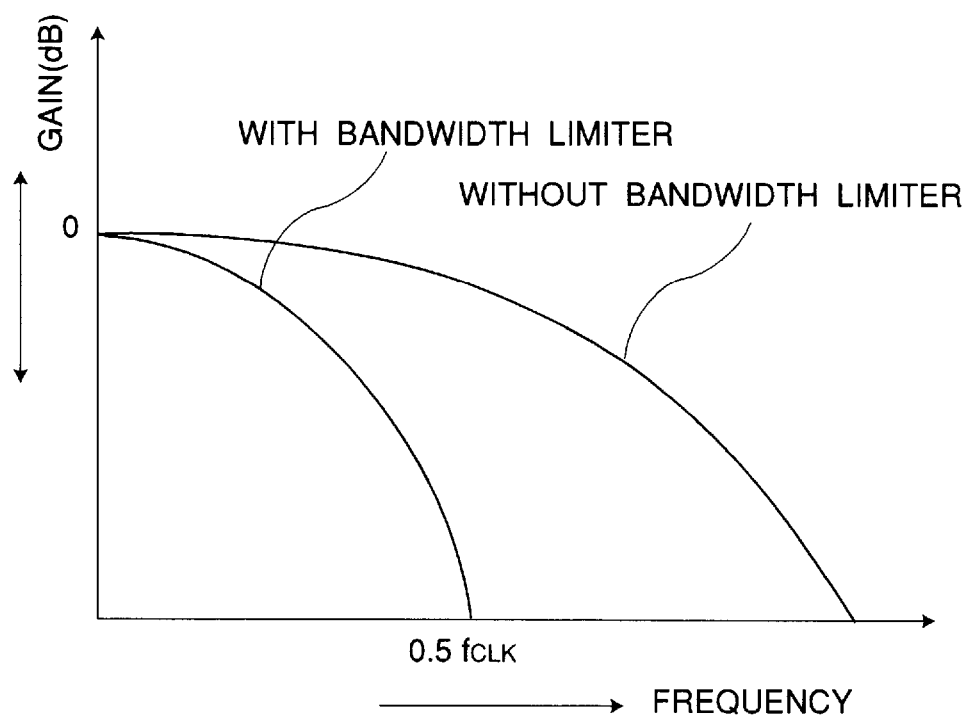
FIG. 5 is an explanatory diagram showing the frequency characteristics of reproduced signals in the first embodiment.

FIG. 5 serves to explain an example of the frequency spectrum of a reproduced signal. In FIG. 5, reproduced-signal frequency spectra at each input node of the A/D converter 8 shown in FIGS. 1 and 2 are depicted for cases where the bandwidth limiter 30 is included and where it is not. Here, the characteristics are depicted for the case where the bandwidth limiter 30 is the (1+D) circuit shown in FIG. 2. As seen from FIG. 5, the PR processing which is performed at the stage preceding the A/D converter 8 brings about the effect of narrowing (compressing) the frequency band. That is, it brings about the effect that noise in a high frequency region can be suppressed to low levels, so the S/N ratio of the reproduced signal can be improved. This signifies that high-density recording is permitted, so a larger storage capacity can be realized. Incidentally, the use of the "8-9 conversion code" as the modulation code is exemplified here. According to the 8-9 conversion code, data of 8 bits is encoded into data of 9 bits, and the number of data "0's" is limited to 0–4 between data "1's". By way of example, when the data transfer rate of the magnetic disk drive is 80 (Mbits/second), the sampling clock fCLK becomes 90 (MHz), and the frequencies of the analog input signals 102 change between 9 (MHz)–45 (MHz).

In this manner, the frequency band required for the A/D converter 8 can be limited by the circuit arrangement as shown in FIG. 3 or FIG. 4.

Figure 7:
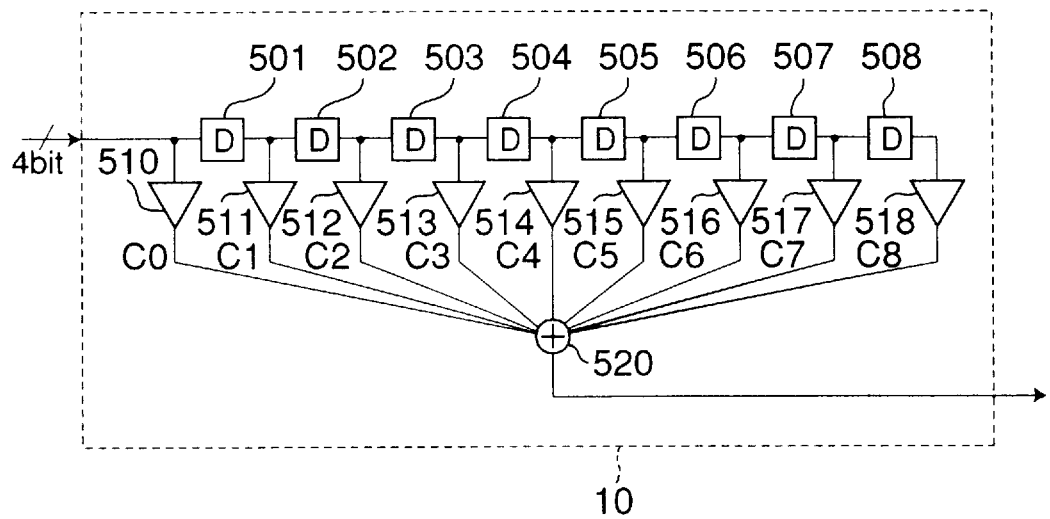
FIG. 7 is a diagram showing the circuit arrangement of an equalizer in the first embodiment.

FIG. 7 illustrates the circuit arrangement of the equalizer 10 shown in FIG. 1. Referring to FIG. 7, the equalizer 10 has a 9-tap construction. Herein, the input signal of this equalizer 10 is delayed for one clock by each of delay elements 501–508, this input signal and the output signals of the delay elements 501–508 are respectively multiplied by preset coefficients C0–C8 by means of multipliers 510–518, and the output signals of the multipliers 510–518 are added up by an adder 520. The coefficients C0–C8 of the respective multipliers 510–518 are set at bisymmetric values. By way of example, the coefficient C4 is set at 1, the coefficients C3 and C5 are set at 0.5, the coefficients C2 and C6 are set at 0.25, the coefficients C1 and C7 are set at 0.125, and the coefficients C0 and C8 are set at 0.0625. Thus, the waveform of the above input signal can be equalized. Besides, such 9-tap circuits each including the delay elements 501–508, multipliers 510–518 and adder 520 are disposed in correspondence with the number of bits of the parallel outputs of the A/D converter 8. Thus, the equalizer 10 can equalize and then deliver the output digital value of the A/D converter 8.

Since, in the construction of this embodiment, the bandwidth limiter 30 for the execution of the PR processing is installed at the stage preceding the A/D converter 8, degradation in the S/N ratio can be suppressed low, and the data sampling by the A/D converter 8 can be carried out at high accuracy. In consequence, the quantization errors of the A/D converter 8 can be suppressed low. Besides, this embodiment becomes more effective as the data transfer rate increased more.

Figure 8:
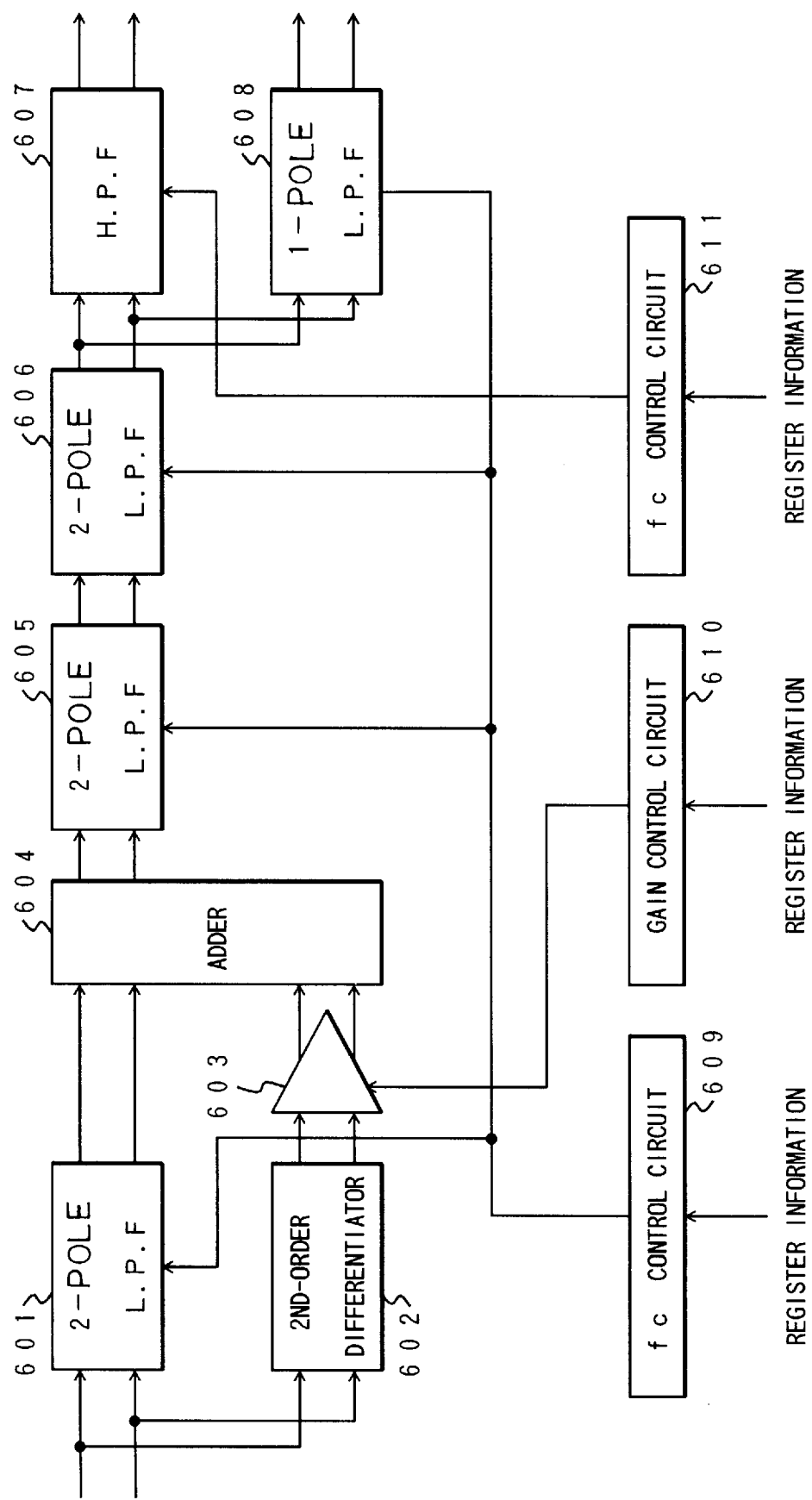
FIG. 8 is a block diagram showing an active filter in the first embodiment.

Meanwhile, in magnetic disk drives, a larger number of models have come to adopt a zone recording system according to which a recording density is held substantially constant at the inner periphery and outer periphery of the magnetic recording medium 1 in order to efficiently use this recording medium. An active filter is necessitated for the practical use of the zone recording system. In this embodiment, the active filter 7 is constructed as shown in FIG. 8. This figure illustrates the block diagram of the active filter 7.

Referring to FIG. 8, a 7-pole low-pass filter is configured of 2-pole low-pass filters 601, 605 and 606 and a 1-pole low-pass filter 608. In the zone recording system, recording/reproducing frequencies are changed in the individual zones of the magnetic recording medium 1, and hence, cutoff frequencies and analog equalization magnitudes need to be changed-over in the respective zones. Herein, the cutoff frequencies and analog equalization magnitudes of the 2-pole low-pass filters 601, 605 and 606 and 1-pole low-pass filter 608 can be respectively changedover through fc control circuits 609 and 611 and a gain control circuit 610 in accordance with register information items which correspond to the individual zones.

Incidentally, numeral 602 denotes a 2nd-Order differentiator, numeral 603 an amplifier, numeral 604 an adder, and numeral 607 a high-pass filter.

Owing to such an active filter 7, the zone recording system can be realized.

Now, the operation of the magnetic disk drive of the present invention as shown in FIG. 1 will be described. Referring to FIG. 1, a signal reproduced from the user data area and an ID (identification) area of the magnetic recording medium 1 by the magnetic head 2 is amplified by the preamplifier 4, the amplified signal is controlled to a predetermined amplitude by the VGA 6, and the controlled signal has high-frequency noise cut and is subjected to the analog equalization by the active filter 7. The output signal of the active filter 7 is subjected to the PR processing in analog signal form by the bandwidth limiter 30, the processed analog signal is converted into a digital signal by the A/D converter 8, and the digital signal is equalized at higher accuracy by the equalizer 10. The resulting signal is detected by the Viterbi detector 18 and is decoded by the decoder 19. The decoded signal is accepted by the disk controller 24. The decoded signal of the ID area is used for the control of an access operation in the recording mode or reproducing mode of the magnetic disk drive by the disk controller 24. The AGC (automatic gain control) is performed in such a way that the gain of the VGA 6 is adjusted using the sample value of the digital signal converted by the A/D converter 8. Besides, the sampling clock 101 which is the reference clock in the A/D conversion of the A/D converter 8 has its phase controlled by the PLL controller 16 so as to be synchronized with the reproduced signal 102. On the other hand, regarding the servo area of the magnetic recording medium 1, the positional information of the magnetic head 2 is decoded by the servo positioning detector 25 and is accepted as a cylinder No. value and a tracking error signal value into the actuator controller 26. In the access operation mentioned above, the actuator controller 26 is controlled in compliance with the command of the disk controller 24. This actuator controller 26 computes the moving speed of the magnetic head 2 and the number of tracks to-be-moved by the use of the output signal of the servo positioning detector 25, and drives the actuator 3 through the actuator driver 27 on the basis of the computed values. Thus, the positioning control of the magnetic head 2 is performed.

Although this embodiment has been described by exemplifying the PR equalization, it may well be applied to the processing of EPR (Extended PR) or EEPR (Extended EPR). In the case of the application to the EPR equalization, the PR processing can be implemented by connecting the (1+D) circuits in series.

According to this embodiment, the PR processing is performed for the analog signal at the stage preceding the A/D converter 8, whereby the frequency band for the A/D conversion can be narrowed to suppress the noise in the high frequency region to low levels and to improve the S/N (signal-to-noise) ratio of the reproduced signal.

Further, for coping with the transfer of data at high speed, it is indispensable to highly integrate signal processing functions in single-chip LSI. Since, in this case, analog circuits and digital circuits are coexistent, there is the problem that noise developing from the digital circuits will degrade the analog performance. The differential input type circuit arrangement of the A/D converter 8 is effective as an expedient for solving this problem. Since, however, an input signal passes through ladder resistors, even such a circuit arrangement is very difficult of coping with an A/D converter the input signal frequency of which is high. In this embodiment, the frequency components of input signals can be sharply lowered as compared with those in the prior-art system, so that the high-speed data transfer can also be coped with and that high-accuracy sampling can be realized.

Owing to the effects stated above, sampling errors can be relieved, with the result that degradation in the S/N ratio can be greatly improved.

Figure 9:
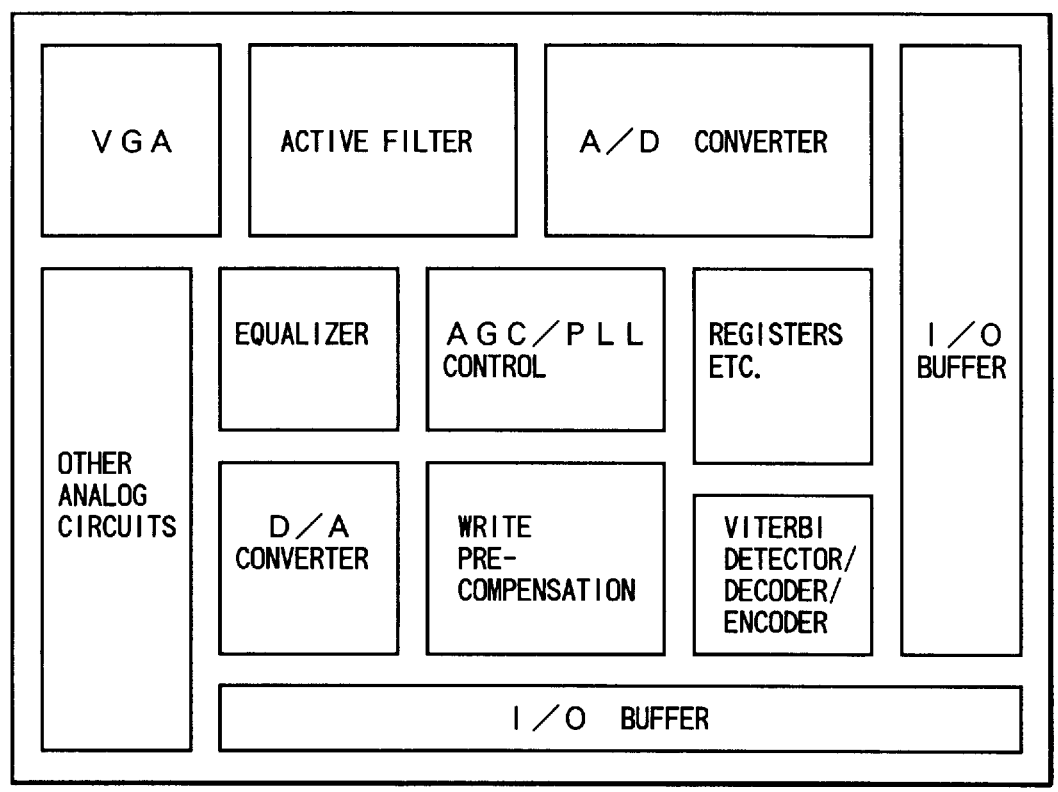
FIG. 9 is a layout diagram showing the LSI of the magnetic disk drive in the first embodiment.

By way of example, an A/D converter having heretofore been configured of 6 bits can be configured of 5 bits or a number of less than 5 bits without incurring any performance degradation, that is, with significant bits maintained. As a result, all of the circuit scales, dissipation power and chip size of the magnetic disk drive can be reduced, which is very effective. Concretely, with the 5-bit configuration, at least the readout module (5 in FIG. 1), A/D converter (8), equalization module (9), decoding module (17), PLL controller (16), AGC module (12) and recording module (20) are permitted to be integrated on a single chip as shown in FIG. 9, and the high-speed data transfer can be coped with.

Next, the second embodiment of the present invention will be described with reference to FIG. 10.

Figure 10:
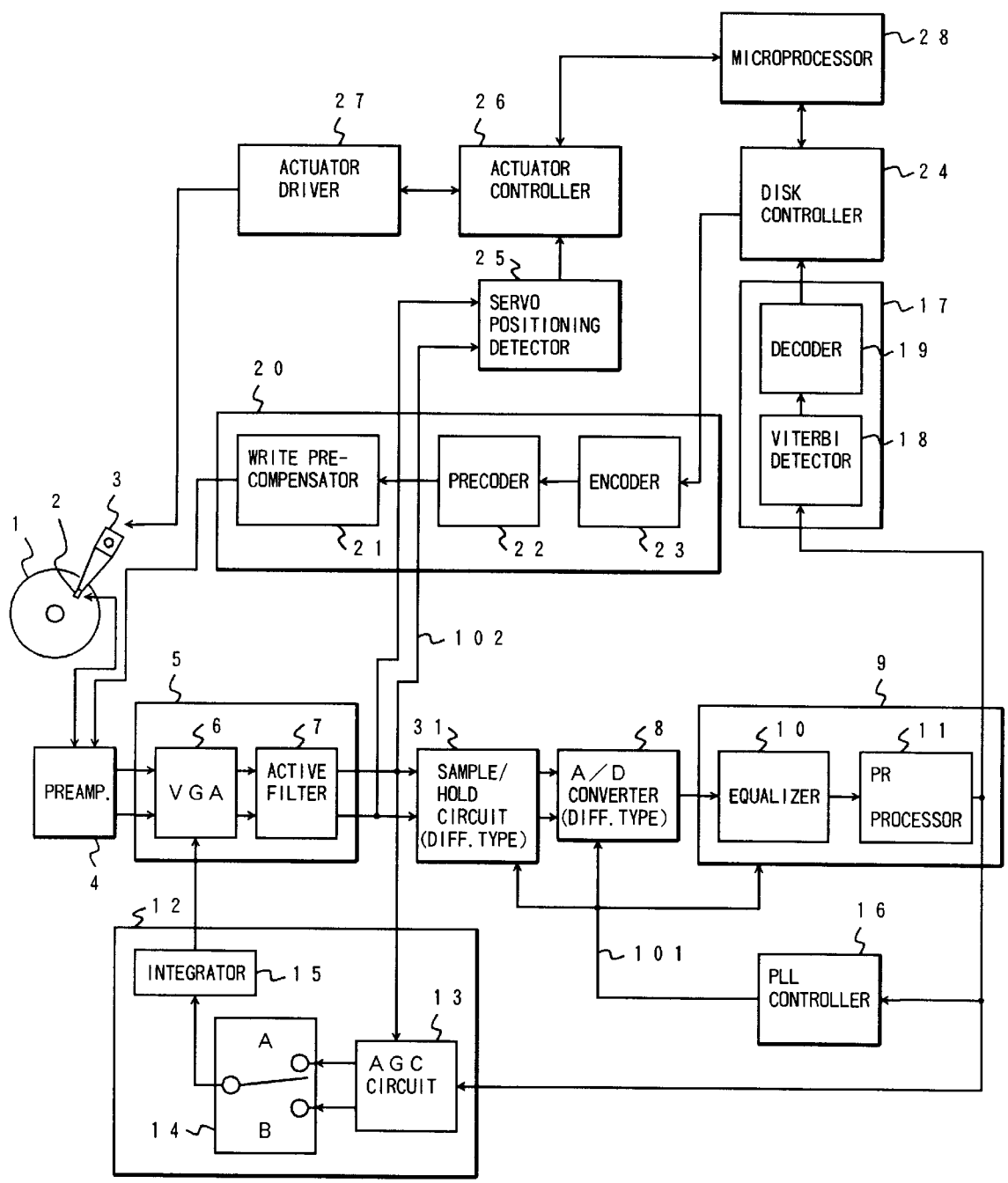
FIG. 10 is a block diagram showing a magnetic disk drive in the second embodiment of the present invention.

FIG. 10 illustrates the block diagram of a magnetic disk drive which demonstrates the features of the second embodiment. In this embodiment, in converting analog signals into digital values by an A/D converter, a sample-and-hold circuit is arranged at a stage preceding the A/D converter. Thus, the analog signals are brought to DC (direct current) -wise levels by the sample-and-hold circuit, and sampling errors in the A/D converter are relieved to the utmost.

The construction shown in FIG. 10 differs from the construction shown in FIG. 1, in including the sample-and-hold circuit 31 by which the outputs 102 of the active filter 7 are sampled and held in accordance with the sampling clock 101. Another difference is that the equalizer 10 which is constructed of the digital transversal filter in order to perform the Nyquist equalization of the digital signal converted by the A/D converter 8, and a PR processor (constructed of a [1+D] circuit) 11 which limits the frequency band of quantization outputs, are included at a stage succeeding the A/D converter 8.

FIG. 11 is a block diagram showing the circuit arrangements of the sample-and-hold circuit 31 and the A/D converter 8 which are of the differential type, in this embodiment. The sample-and-hold circuit 31 shown in FIG. 11 can be constructed by utilizing the sample-and-hold circuit in the foregoing first embodiment as shown in FIG. 3.

In FIG. 11, the A/D converter 8 is exemplified as a flash type one of 4-bit configuration, and it includes comparator circuits 81 and an encoder/latch circuit 82. More specifically, the outputs of the fifteen comparator circuits 81 are entered into the encoder/latch circuit 82, from which a digital output signal of 4 bits is sent to the equalizer 10 at the succeeding stage. In this embodiment, owing to the additional provision of the sample-and-hold circuit 31 at the stage preceding the comparator circuits 81, the sampling errors in the A/D converter 8 are relieved to the utmost even for the input signals of high frequency. Besides, in this embodiment, the input frequencies of the A/D converter 8 are turned into the DC-wise levels by the sample-and-hold circuit 31, and the high-speed sampling of the A/D converter 8 can be realized with ease. More specifically, owing to the provision of the sample-and-hold circuit 31, the A/D converter 8 can be constructed of the differential type circuit, and the noise immunity thereof can be enhanced. Here, for the purpose of reducing noise interference among the constituent circuits as far as possible, it is also important that the sample-and-hold circuit 31 and the A/D converter 8 have their power source terminals and ground terminals made common so as to be isolated from the other circuit blocks.

Figure 12:
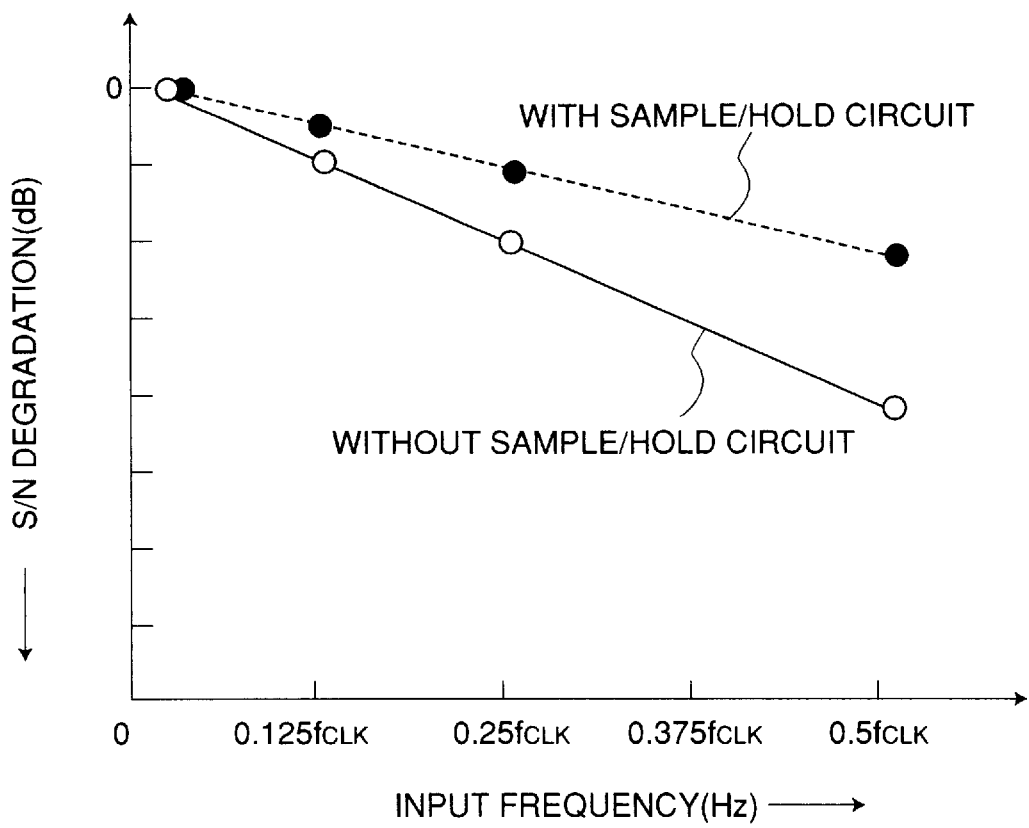
FIG. 12 is an explanatory diagram showing the AC (alternating-current) characteristics of an A/D converter in the second embodiment.

FIG. 12 exemplifies the estimated result of S/N ratio degradation which is one sort of the AC characteristics of the A/D converter 8. The effect of the sample-and-hold function versus the input frequencies of the analog input signals (102 in FIGS. 10 and 11) is seen from FIG. 12 by comparing the S/N ratio degradations in the cases where the sample-andhold circuit 31 is disposed at the stage preceding the A/D converter 8 and where it is not. Here in FIG. 12, the input frequencies are normalized with the sampling clock (101 in FIGS. 10 and 11). Besides, the use of the "8-9 conversion code" as the modulation code is exemplified here. When the data transfer rate of the magnetic disk drive is 80 (Mbits/second), the sampling clock fCLK becomes 90 (MHz), and the frequencies of the analog input signals 102 change between 9 (MHz)–45 (MHz).

As shown in FIG. 12, the S/N ratio degradation of the A/D converter 8 increases more with the higher input frequency. That is, the AC dynamic precision of the A/D converter 8 becomes lower and the number of significant bits thereof becomes smaller as the signal frequency heightens more. The sample-and-hold circuit 31 is therefore disposed, whereby the sampling errors can be relieved, with the result that the S/N ratio degradation can be greatly improved. The S/N ratio degradation in the presence of the sample-and-hold function is decreased to about half as compared with that in the absence thereof, at a point of 0.5 fCLK (corresponding to 45 MHz) which lies within a high-frequency input range. A similar effect is produced also at a point of 0.125 fCLK which lies within a low-frequency input range. In this manner, the S/N ratio degradation can be suppressed low owing to the additional provision of the sample-and-hold circuit 31. Therefore, the A/D converter having heretofore been configured of 6 bits without the sample-and-hold function can have the number of bits decreased to 5 or less without incurring any performance degradation. As a result, all of the circuit scales, dissipation power and chip size of the magnetic disk drive can be reduced, and the transfer of data at high speed can be realized. These effects are very great.

Although this embodiment has been described by exemplifying the PR equalization, it may well be applied to the processing of EPR (Extended PR) or EEPR (Extended EPR). In the case of the application to the EPR equalization, the PR processor 11 can be constructed of a circuit arrangement in which the (1+D) circuits are connected in series. Thus, this embodiment is applicable to the PRML signal processing system, EPRML signal processing system and EEPRML signal processing system.

Figure 13:
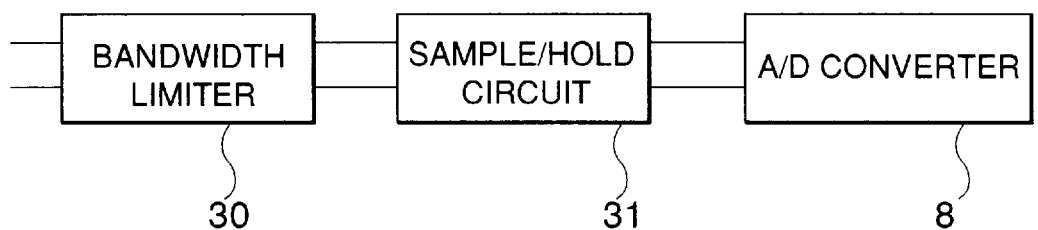
FIG. 13 is a block diagram showing another embodiment in the case where the bandwidth limiter and the sample-and-hold circuit are comprised.

Alternatively, both the bandwidth limiter 30 in the first embodiment and the sample-and-hold circuit 31 in the second embodiment may well be disposed at the stage preceding the A/D converter 8, as shown in FIG. 13. Thus, the S/N ratio degradation can be suppressed still lower.

Figure 15:
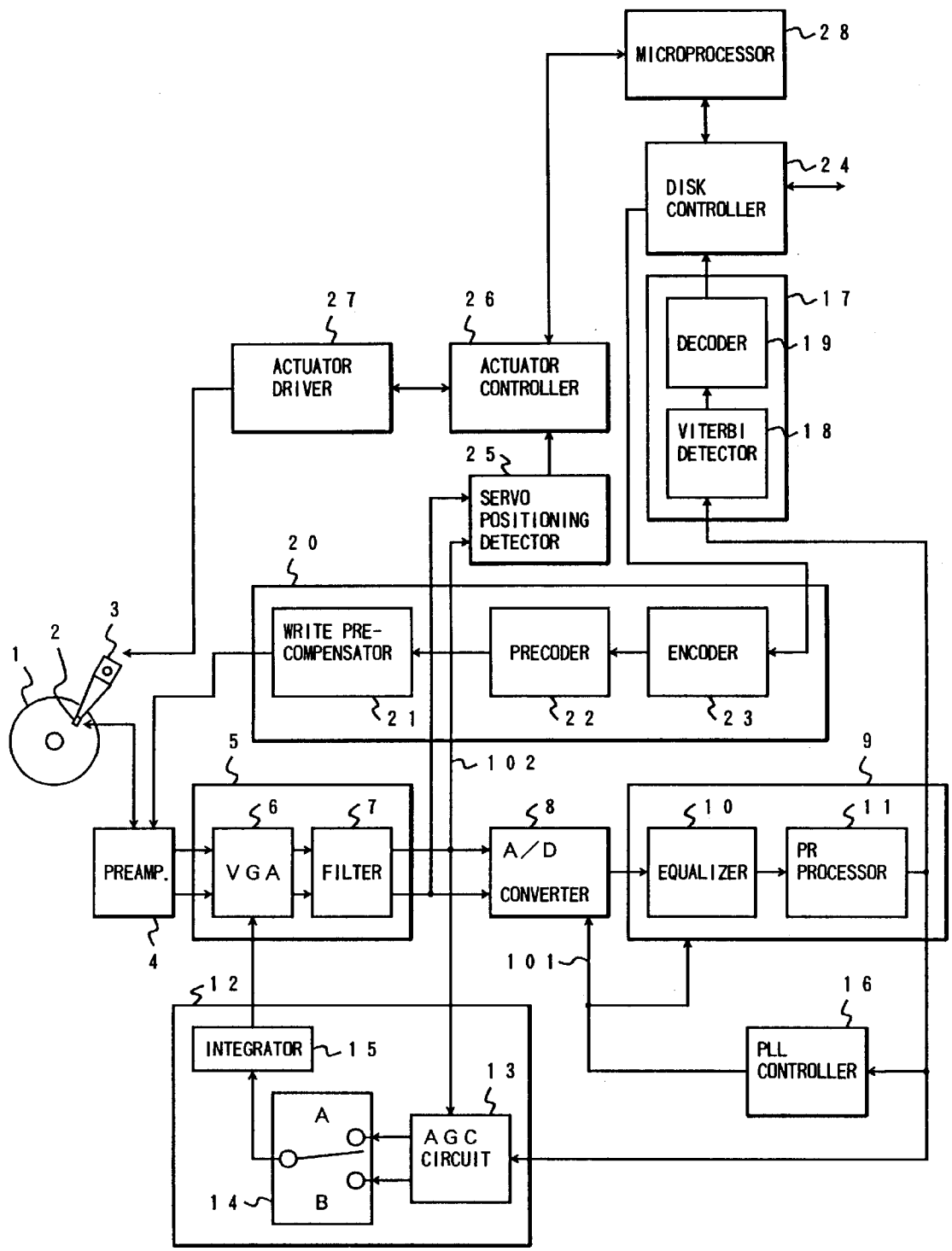
FIG. 15 is a block diagram showing a magnetic disk drive in the prior art.
Figure 16:
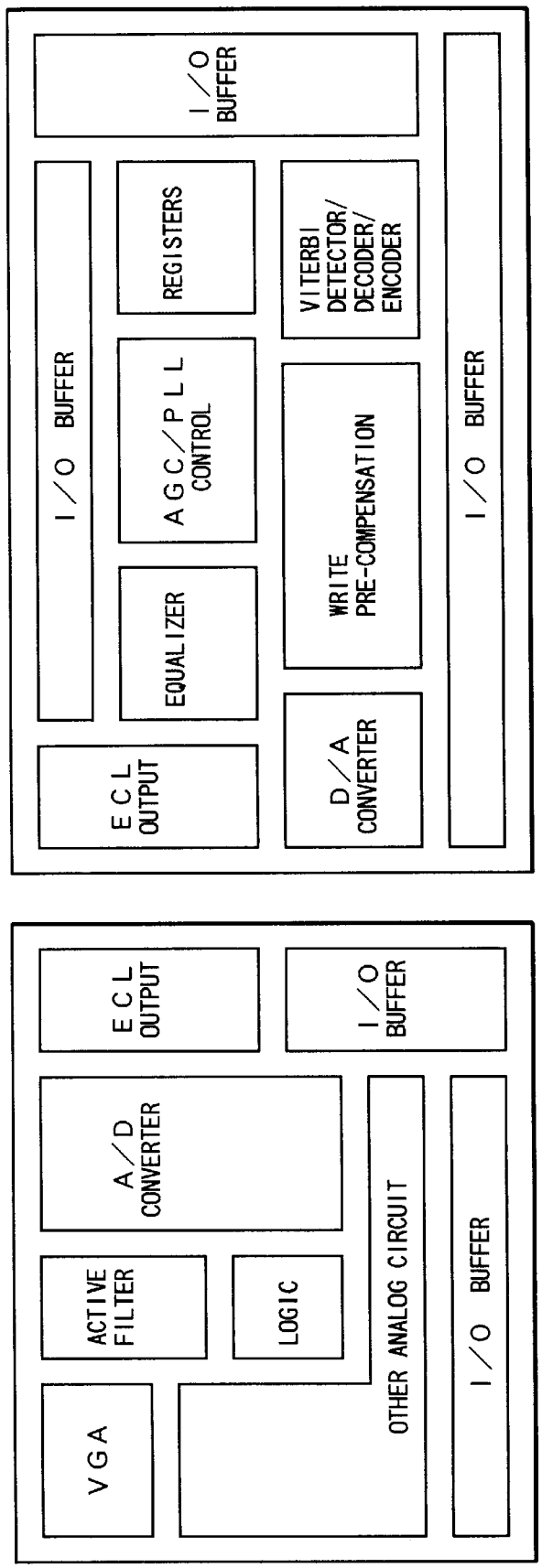
FIG. 16 is a layout diagram showing the LSI of the magnetic disk drive in the prior art.

FIG. 14 is a table for exemplifying the dissipation power lowering effects of the present invention as compared with the prior-art example. In the table of FIG. 14, regarding the prior-art example, each of the A/D converter, equalizer, Viterbi detector and other digital circuits is endowed with the 6-bit configuration in the construction shown in FIG. 15, and the power ratios of the respective blocks are indicated by setting the power of the whole construction to 1.00. Also in the table, regarding the construction of the first embodiment shown in FIG. 1, each of the A/D converter (differential type), equalizer, Viterbi detector and other digital circuits is endowed with the 5-bit configuration in case of attaining the same data transfer rate as in the prior art, and the power ratios of the respective blocks are indicated by setting the power of the whole prior-art construction to 1.00. Further, in the table, regarding the construction of the second embodiment shown in FIG. 10, each of the A/D converter (differential type), equalizer, Viterbi detector and other digital circuits is endowed with the 4-bit configuration in case of attaining the same data transfer rate as in the prior art, and the power ratios of the respective blocks are indicated by setting the power of the whole prior-art construction to 1.00.

When compared with the prior-art example whose dissipation power is 1.00, the first embodiment of the present invention dissipates a total power of 0.85 and can be expected to curtail the power dissipation by about 15%. On the other hand, the second embodiment of the present invention dissipates a total power of 0.65 and is effective to curtail the power dissipation by about 35%. Furthermore, according to each of the embodiments, the effect of reducing the area of the chip is also produced owing to the lowered dissipation power, and a lower cost is finally attained.

According to the first or second embodiment, the PR processing is performed for the analog signals preceding the A/D converter, whereby the frequency band for the A/D conversion can be lowered, so that the high-accuracy data sampling is permitted and that the high-speed data transfer can be coped with. Further, owing to the differential type circuit arrangement of the A/D converter, data can be sampled at a higher accuracy, so that the number of bits of the A/D converter can be decreased to reduce the circuit scales of the equalization module, etc. Owing to the decrease in the number of bits of the A/D converter, at least the readout module, A/D converter, equalization module, decoding module, PLL controller, AGC module and recording module are permitted to be highly integrated on the same chip as shown in FIG. 9, and the higher speed and higher accuracy of the read/write signal processing can be realized.

Besides, according to the second embodiment, the sample-and-hold circuit is disposed at the stage preceding the A/D converter, whereby the high-speed data transfer can be coped with. Further, owing to the differential type circuit arrangements of the sample-and-hold circuit and the A/D converter, the high-accuracy data sampling is permitted. As a result, the number of bits of the A/D converter can be decreased.

Moreover, according to each embodiment, a recording/reproducing semiconductor integrated circuit of high integration degree with a built-in A/D converter can be constructed, and recording/reproducing apparatus can be rendered smaller in size, faster in operation and lower in power dissipation.

What is claimed is:

1. Decoder circuitry comprising:
   a readout circuit which reads out signals from a recording medium;
   a bandwidth limiting circuit which performs a PR (partial response) processing on the signals read out by the readout circuit in analog signal form by limiting a frequency band of the signals read out by the readout circuit in accordance with the PR processing to produce bandwidth-limited signals;
   an A/D (analog-to-digital) converter which converts the bandwidth-limited signals produced by the bandwidth limiting circuit into digital data based on a timing of a reference clock;
   an equalizer which equalizes the digital data converted by the A/D converter;
   a decoder circuit which decodes the digital data equalized by the equalizer; and
   a PLL (phase-locked loop) circuit which generates the reference clock;
   wherein the readout circuit produces first output signals and second output signals, the signals read out from the medium being a difference between the first output signals and the second output signals;

wherein the bandwidth limiting circuit includes
- a first master/slave sample-and-hold circuit which samples and holds the first output signals produced by the readout circuit based on the timing of the reference clock to produce first delayed signals,
- a second master/slave sample-and-hold circuit which samples and holds the second output signals produced by the readout circuit based on the timing of the reference clock to produce second delayed signals, and
- an adder circuit which adds the first delayed signals produced by the first sample-and-hold circuit to the first output signals produced by the readout circuit to produce first bandwidth-limited signals, and adds the second delayed signals produced by the second sample-and-hold circuit to the second output signals produced by the readout circuit to produce second bandwidth-limited signals; and wherein the A/D converter is a differential-type A/D converter which converts a difference between the first bandwidth-limited signals produced by the bandwidth limiting circuit and the second bandwidth-limited signals produced by the bandwidth limiting circuit to the digital data.

2. Decoder circuitry comprising:

a readout circuit which reads out signals from a recording medium;

a differential-type master/slave sample-and-hold circuit which samples and holds the signals read out by the readout circuit based on a timing of a reference clock to limit a frequency band of the signals read out by the readout circuit and produce bandwidth-limited signals;

a differential-type A/D (analog-to-digital) converter which converts the bandwidth-limited signals produced by the sample-and-hold circuit into digital data having less than 6 bits based on the timing of the reference clock;

an equalizer which equalizes the digital data converted by the A/D converter;

a PR (partial response) processing circuit which performs a PR processing on the digital data equalized by the equalizer;

a decoder circuit which decodes the digital data processed by the PR processing circuit; and a PLL (phase-locked loop) circuit which generates the reference clock;

wherein the readout circuit produces first output signals and second output signals, the signals read out from the medium being a difference between the first output signals and the second output signals;

wherein the sample-and-hold circuit includes
- a first master/slave sample-and-hold circuit which samples and holds the first output signals produced by the readout circuit based on the timing of the reference clock to produce first bandwidth-limited signals, and
- a second master/slave sample-and-hold circuit which samples and holds the second output signals produced by the readout circuit based on the timing of the reference clock to produce second bandwidth-limited signals; and wherein the A/D converter converts a difference between the first bandwidth-limited signals produced by the first sample-and-hold circuit and the second bandwidth-limited signals produced by the second sample-and-hold circuit to the digital data.

3. Decoder circuitry comprising:

a readout circuit which reads out signals from a recording medium;

a differential-type master/slave sample-and-hold circuit which samples and holds the signals read out by the readout circuit based on a timing of a reference clock to limit a frequency band of the signals read out by the readout circuit and produce bandwidth-limited signals;

a differential-type A/D (analog-to-digital) converter which converts the bandwidth-limited signals produced by the sample-and-hold circuit into digital data having less than 6 bits based on the timing of the reference clock;

an equalizer which equalizes the digital data converted by the A/D converter;

a decoder circuit which decodes the digital data equalized by the equalizer; and a PLL (phase-locked loop) circuit which generates the reference clock;

wherein the readout circuit produces first output signals and second output signals, the signals read out from the medium being a difference between the first output signals and the second output signals;

wherein the sample-and-hold circuit includes
- a first master/slave sample-and-hold circuit which samples and holds the first output signals produced by the readout circuit based on the timing of the reference clock to produce first bandwidth-limited signals, and
- a second master/slave sample-and-hold circuit which samples and holds the second output signals produced by the readout circuit based on the timing of the reference clock to produce second bandwidth-limited signals; and wherein the A/D converter converts a difference between the first bandwidth-limited signals produced by the first sample-and-hold circuit and the second bandwidth-limited signals produced by the second sample-and-hold circuit to the digital data.

* * * * *